Oct. 22, 1968  F. GROSS  3,406,989
COMBINED MULTIPLE FLUID DISTRIBUTION PANEL BLOCKS AND
CONNECTOR MEANS THEREFOR
Filed May 2, 1966
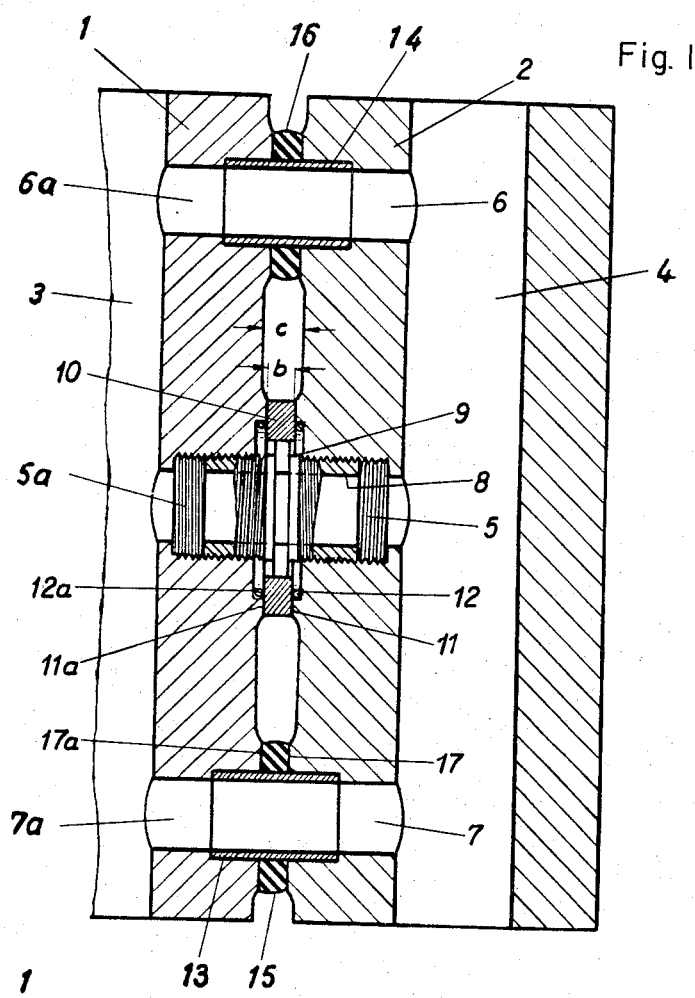
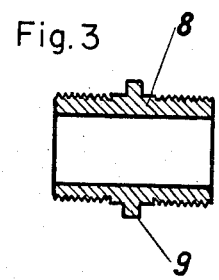
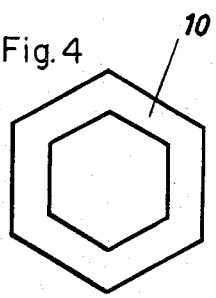
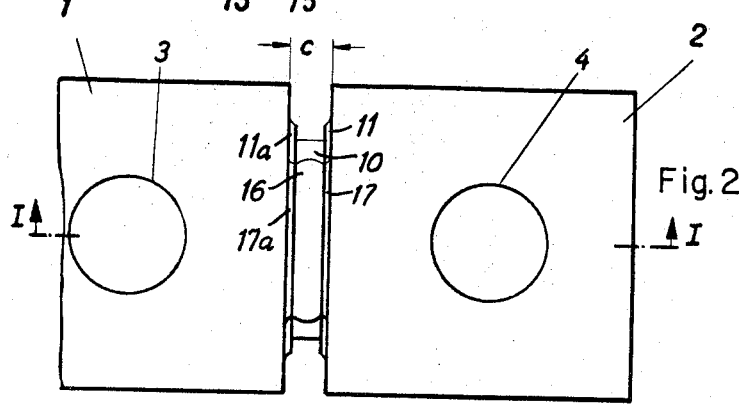
INVENTOR
FRIEDRICH GROSS
BY Ralph W. McIntosh Jr.
ATTORNEY

United States Patent Office 3,406,989
Patented Oct. 22, 1968

3,406,989
COMBINED MULTIPLE FLUID DISTRIBUTION PANEL BLOCKS AND CONNECTOR MEANS THEREFOR
Friedrich Gross, Bergfeld, Germany, assignor to Westinghouse Bremsen-und Apparatebau-G.m.b.H., Hannover, Germany
Filed May 2, 1966, Ser. No. 546,866
Claims priority, application Germany, June 11, 1965, W 35,115
4 Claims. (Cl. 285—137)

ABSTRACT OF THE DISCLOSURE

Combined multiple fluid distribution panel blocks and connector means therefor, in which, a pair of panel blocks are disposed in end-to-end relationship, each including a plurality of passages opening at the end surface in axial registration with similar passages in the other panel block, forming a plurality of axially registered pairs of passages, in combination with a connector having its opposite ends threadedly received in each passage in one of the registered pairs of passages by rotation of an external ring keyed to the connector to provide a force tightly engaging the end surfaces of the adjacent blocks with opposite sides of the ring, and an additional connector for each of the other registered pairs of passages, each additional connector having its opposite ends slidably received in passages of a different one of the additional registered pairs of passages and including, a sealing ring peripherally disposed intermediately thereof to seal the corresponding registered pair of passages when the connector in the one pair of registered passages is tightened.

---

Control slide valves which are often of considerable length are included in the control blocks and are movable in a sliding manner in their cylinders with minimum outer radial clearance. Even the smallest distortion of the block housing and therewith the cylinders retards or prevents the slide valve movement. Thereupon, it became necessary that during the assembling together of multiple control blocks, screw methods were utilized to prevent the distortion by means of the screw force.

In addition to these forces, however, there also occur in service those distortions which occur from the pressure mediums particularly with pressures of 150 atmospheres (2115.0 p.s.i) or more in the canal cross sections that lead from block to block which pressures exert considerable forces in the block housing that cause spreading. In addition, these can be caused by an undesirable screw arrangement distortion of the block housings.

With the conventional type arrangements of panel blocks it is desired in a mutual joining thereof that the assembling of the block housings occurs in a manner so that they lie directly one on the other through their entire length and in their total or partial width. These are held securely together either by means of anchor bolts that go all the way through the assembly or by means of screws, which exert their force merely upon two walls that are neighboring to each other. This arrangement of the block connection acts to prevent the distortion by means of the bolt forces so that the block walls which lie one upon the other are absolutely in plane for the assembly. This plane exactness can only be achieved by means of the preparatory work, connecting clamping by means of warm handling as well as the subsequent fine working of the flat surfaces, all involving expensive work processes. With the aforementioned utilization of directly abutting plane surface areas it is also difficult to achieve an unrestricted slide valve function.

The above mentioned forces that occur because of the pressure mediums and because of the spreading forces that are obtained in the canal cross sections that lead from block to block, and only in the pressure canals not in the return flow canals, become considerable and therefore of a value that is to be considered. These forces effect with the conventional type arrangement a bending moment in the individual block housings. In addition, the bolts that are to absorb this force are disposed a lesser or greater distance from the center of the working surface depending on the forces. The greater the distance (lever arm) is, the greater is the bending moment and thereby the danger of the distortion of the block housing. These forces can also cause the retarding in the movement of the slide valve as well as also the destruction of the sealing of the sealing rings in the corresponding high pressure canal cross sections.

The present invention overcomes these objections. It serves as its purpose to eliminate the established disadvantages. Especially, the unnecessary expensive surface handling and the causes of the bending moments through means of the mentioned spreading forces are eliminated.

In the present invention, this object is achieved by providing a tubular connector with external left-hand threads on one end for insertion in the correspondingly threaded end of a pressure passage in the end surface of one panel block, and with right-hand threads on the other end for insertion in the correspondingly threaded end of a pressure passage in the adjacent block. The center of the connector is provided with a peripheral collar keyed to a ring member peripherally engaging the collar for rotating the connector to simultaneously insert the ends of the connector in the corresponding passages until the end surfaces of the panel blocks tightly abut the opposite sides of the ring member. In order to interconnect the fluid return passages of one panel block with the axially registering fluid return passages in the adjacent block, and to prevent relative rotation of the blocks, a tubular member having a smooth exterior and a peripheral seal member externally disposed thereon is disposed with its opposite ends in each axially registering pair of fluid return passages for slidable insertion in the corresponding passages when the aforementioned threaded connector is tightened in the registering pressure passages. The seal member on each tubular member in the return passages is engaged on opposite sides by the end faces of the adjacent panel blocks to seal the return passages and prevent leakage to atmosphere.

This and other objects will become more readily apparent in the following description, taken with the drawing, in which:

FIG. 1 is an elevational view, taken in section, of a pair of panel blocks and connector means therefor, taken along the line 1—1 of FIG. 2;

FIG. 2 is an elevational view of the panel blocks of FIG. 1;

FIG. 3 is a cross-sectional view of the connector means of FIG. 1; and

FIG. 4 is a side elevational view of the nut portion of the connector means shown in FIG. 1.

The designations 1 and 2 illustrate two adjacent and joined, one to the other, block housings, which include passages 3 and 4, respectively, for a slide valve which is not illustrated. Between the block housings there are arranged connection canals 5a and 5 which are positioned in opposing location for the high pressure fluid medium, and connection canals 6 and 6a and 7 and 7a for the return flow. The screwing of the housings 1 and 2 one to the other, as well as the sealing of the canal ends that are to be connected, is achieved with an allowance for the canal pressures, and is accomplished by bushings which project into the opposing positioned canal ends.

The ends of the high pressure canals 5 and 5a are equipped with left and right-hand threads, respectively, in which the threaded bushing 8 that serves as a forked screw is inserted. With its rotation, the block housings 1 and 2 are clamped together in a manner that is hereinafter described. In the middle of the cavity formed by passages 5 and 5a, there is supported the threaded bushing 8, having a hexagonal collar 9 with a width of a. This hexagonal collar engages into a nut comprising a female ring 10 with some clearance since the nut has a width b that is greater than a. Once again there is a gap c that is greater than the measurement b and that is between the block housings 1 and 2 so the outer edge of the female ring 10 is available for a screw key and therewith the threaded bushing 8 can be tightened and loosened. With the tightening, the circular shaped ground buttings 11 and 11a, respectively, of the block housings 1 and 2, are pressed against the likewise ground flanges or sides of the hexagonal ring 10. Thereby, there are in existence scratch-free cages for the seal rings 12 and 12a. The female ring is intended firstly, for the equalization around the right and left different arrangements of the thread sequence and the equalization of the axial displacement of the threaded bushing 8 that occurs therewith and secondly, to provide a plane parallel ground housing connection.

In the present arrangement, the canals 6 and 6a as well as the canals 7 and 7a, which are subjected to minute return flow pressures, are connected by the means of smooth inserted bushings 14 and 13 respectively, which prevent the rotation of the block housing around the individual screw or threaded bushing 8. They are surrounded by means of the sealing rings 15 and 16 against which lateral surfaces thereof the circular buttings 17 and 17a of the block housings lie with the concentric sealing channels. This construction is sufficient in these cases to seal against the minute pressures. All the buttings 11 and 11a and 17 and 17a of the block housings are ground in the operative location.

Additional advantages are obtained from the arrangement in accordance with the conditions of the invention. First, the labor and cost of preparing absolutely plane surfaces of great extent are avoided. Only the housing buttings 11 and 11a have the metal contact surfaces. In the case that these are not completely plane parallel, then the elastical sealings 15 and 16 equalize without any danger that the block housings are distorted. Despite the reduced preparation costs, the functions of the control slide valve is still assured. The canal diameters that lead from block to block inside of the seal rings 12 and 12a are subjected during highest pressures to the very substantial spreading forces, however, they do not cause any bending moment in the block housings. Since the threaded bushing 8 that absorbs these forces is centrally arranged in the working surface of the spreading forces, there is no lever arm in existence. Thereby, the distortion danger for the block housings that is due to these forces is likewise eliminated.

The above discussed advantages of the present invention also are effective when the panel block housings are to be connected with the two high pressure canals. Thus, two threaded bushings may be provided.

Having now described the invention, what I claim as new and desire to secure by Letters Patent is:

1. Combined multiple fluid distribution panel blocks and connector means therefor, comprising:
   (a) a pair of panel blocks each having an end surface laterally disposed opposite the end surface of the other,
   (b) a plurality of passages internally disposed in each of said panel blocks, each passage opening at said end surface of the corresponding panel block and axially registering with a different one of the plurality of passages opening at the end surface of the other panel block forming a plurality of pairs of axially registering passages,
   (c) one passage of one pair of said plurality of pairs of axially registering passages being internally threaded in a left-handed manner,
   (d) the other passage of said one pair of passages being internally threaded in a right-handed manner,
   (e) a fitting connecting said pair of panel blocks, said fitting comprising:
       (i) a hollow cylindrical body having opposite end portions,
       (ii) said opposite end portions having threads externally disposed thereon, the threads on one of said ends being directed oppositely the threads on the other of said ends, said ends each being threadedly inserted in one of the corresponding passages of said one pair of registering passages,
       (iii) a collar disposed on said cylindrical body intermediate said ends, said collar having a predetermined width axially of said cylindrical body,
       (iv) a ring member coaxially disposed on said collar for axial movement with respect thereto and having a width greater than the width of said collar,
       (v) the outer periphery of said collar and the inner periphery of said ring having a mutually cooperative configuration preventing relative rotational movement therebetween, and
       (vi) said opposite sides of said ring member comprising seats each abutting one of the end surfaces of said panel blocks when the fitting is tightened,
   (f) a hollow member defined by smooth uninterrupted cylindrical inner and outer surfaces of uniform diameter throughout its axial length for each of the other of said plurality of pairs of registering passages and having the opposite ends thereof slidably received in the corresponding pair of registering passages,
   (g) sealing means peripherally disposed on each hollow cylindrical member and laterally compressed between the said end surfaces when said fitting is in a tightened condition, and
   (h) ring seal means surrounding each passage of said one pair of axially registered passages and compressible between the corresponding one of said pair of panel blocks and the corresponding one of said opposite sides of said ring member when said fitting is tightened.

2. Combined multiple fluid distribution panel blocks and connector means therefor, as recited in claim 1, further characterized in that each passage of said one pair of registering passages includes a counterbore defined by wall portions of said block forming a shoulder between the passage and the end surface, said ring seal means disposed in each counterbore and axially compressed between said shoulder and the corresponding one of said opposite sides of said ring member.

3. Combined multiple fluid distribution panel blocks and connector means therefor, as recited in claim 1, further characterized in that each of said end surfaces includes a raised area peripherally surrounding the opening of each passage of said one pair of registering passages, said raised portion being engaged with the corresponding one of said opposite sides of said ring member when the fitting is tightened.

4. Combined multiple fluid distribution panel blocks and connector means therefor, as recited in claim 1, in which, said one pair of axially registering passages comprises fluid pressure passages, and said other of said plurality of pairs of axially registering passages comprise fluid return passages.

References Cited

UNITED STATES PATENTS

| | | | |
|---|---|---|---|
| 2,329,935 | 9/1943 | Nowak et al. | 285—370 X |
| 3,111,139 | 11/1963 | Beckett et al. | 251—367 X |
| 3,158,164 | 11/1964 | Barton | 137—15 |

FOREIGN PATENTS

| | | |
|---|---|---|
| 26,964 | 1/1907 | Austria. |
| 298,510 | 11/1919 | Germany. |
| 1,031,595 | 6/1958 | Germany. |

CARL W. TOMLIN, *Primary Examiner.*

DAVE W. AROLA, *Assistant Examiner.*